United States Patent
Matsuda

(10) Patent No.: US 12,518,022 B2
(45) Date of Patent: Jan. 6, 2026

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: BROTHER KOGYO KABUSHIKI KAISHA, Nagoya (JP)

(72) Inventor: Munehisa Matsuda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 163 days.

(21) Appl. No.: 18/474,338

(22) Filed: Sep. 26, 2023

(65) Prior Publication Data
US 2024/0111878 A1 Apr. 4, 2024

(30) Foreign Application Priority Data
Sep. 29, 2022 (JP) .................... 2022-156643

(51) Int. Cl.
*G06F 21/57* (2013.01)
*G06F 21/00* (2013.01)
*G06F 21/55* (2013.01)

(52) U.S. Cl.
CPC ............ *G06F 21/577* (2013.01); *G06F 21/55* (2013.01)

(58) Field of Classification Search
CPC ........ G06F 21/577; G06F 21/55; G06F 21/50; G06F 21/554; G06F 21/56; G06F 21/568; G06F 21/57
See application file for complete search history.

(56) References Cited

U.S. PATENT DOCUMENTS

| | | | |
|---|---|---|---|
| 2020/0226266 A1 | 7/2020 | Fukami et al. | |
| 2022/0078204 A1* | 3/2022 | Mori ...................... | G06F 21/608 |
| 2024/0020383 A1* | 1/2024 | Connor ................... | H04L 9/003 |

FOREIGN PATENT DOCUMENTS

JP 2020-113090 A 7/2020

* cited by examiner

*Primary Examiner* — Edward Zee
(74) *Attorney, Agent, or Firm* — Scully, Scott, Murphy & Presser, P.C.

(57) ABSTRACT

A communication device may: receive, from a server, first countermeasure information corresponding to a first countermeasure for a first vulnerability of the communication device; in a case where the first countermeasure information is received from the server, execute the first countermeasure; in a situation where the communication device is executing the first countermeasure, receive, from the server, second countermeasure information corresponding to a second countermeasure for the first vulnerability; in a case where the second countermeasure information is received from the server, disable the first countermeasure; and in the case where the second countermeasure information is received from the server, execute the second countermeasure.

10 Claims, 8 Drawing Sheets

(First to Third Embodiments)

(First Embodiment)

(Second Embodiment)

(Fourth Embodiment)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

REFERENCE TO RELATED APPLICATION

This application claims priority from Japanese Patent Application No. 2022-156643 filed on Sep. 29, 2022. The entire content of the priority application is incorporated herein by reference.

BACKGROUND ART

A vulnerability impact assessment system is known. The vulnerability impact assessment system collects vulnerability information, and when it determines that there is a connection between the vulnerability information and a target system for assessment, the vulnerability impact assessment system implements a vulnerability countermeasure included in the vulnerability information on the target system for assessment.

DESCRIPTION

The present teachings disclose a technique configured to enhance security of a communication device.

A communication device disclosed herein may include: a controller, wherein the controller may be configured to: receive, from a server, first countermeasure information corresponding to a first countermeasure for a first vulnerability of the communication device; in a case where the first countermeasure information is received from the server, execute the first countermeasure; in a situation where the communication device is executing the first countermeasure, receive, from the server, second countermeasure information corresponding to a second countermeasure for the first vulnerability; in a case where the second countermeasure information is received from the server, disable the first countermeasure; and in the case where the second countermeasure information is received from the server, execute the second countermeasure.

According to the above configuration, the communication device receives, from the server, the second countermeasure information indicating the second countermeasure for the first vulnerability in the situation where the communication device is executing the first countermeasure for the first vulnerability. In this case, the communication device disables the first countermeasure and executes the second countermeasure. In this way, the communication device can execute a latest countermeasure on the first vulnerability. For this reason, security of the communication device can be enhanced.

A computer program for the communication device as described above, a non-transitory computer-readable recording medium storing the computer-readable instructions for the communication device, and a method performed by the communication device are also novel and useful.

Figure 1:
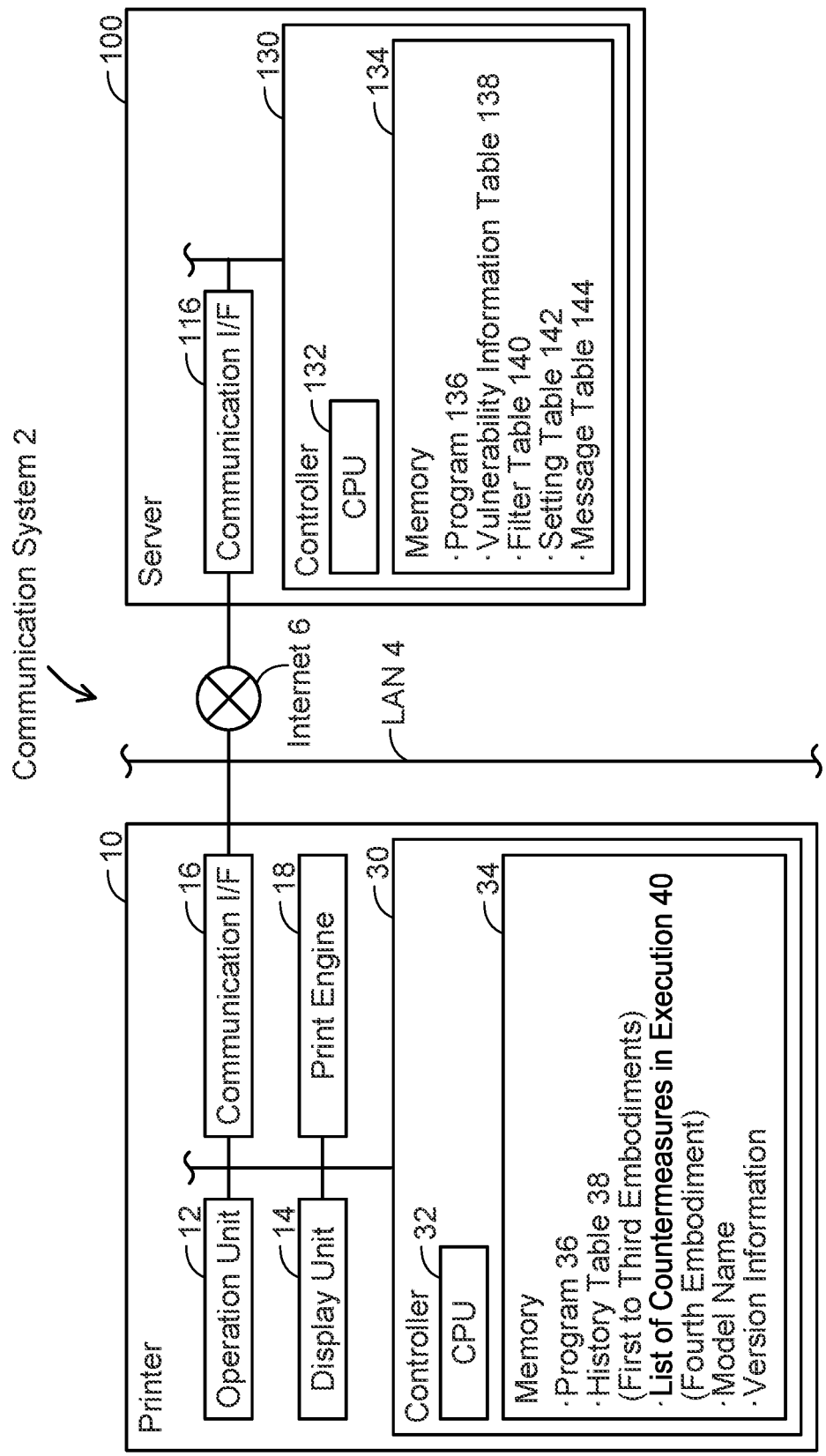
FIG. 1 illustrates a configuration of a communication system.

FIRST EMBODIMENT (Configuration of Communication System 2; FIG. 1)

As shown in FIG. 1, a communication system 2 comprises a printer 10 and a server 100. The printer 10 is connected to a Local Area Network (LAN) 4. The LAN 4 may be a wireless LAN or a wired LAN. The server 100 is arranged on the Internet 6. The printer 10 and the server 100 are configured to communicate with each other via the LAN 4 and the Internet 6.

(Configuration of Printer 10)

The printer 10 is a peripheral device configured to execute a print function. In a modification, the printer 10 may be a multi-function peripheral configured to execute a scanning function and/or a facsimile function, for example, in addition to the print function. The printer 10 includes an operation unit 12, a display unit 14, a communication interface 16, a print engine 18, and a controller 30. Each unit 12 to 30 is connected to a bus line. Hereinafter, the interface will be referred to as "I/F".

The operation unit 12 is an OF configured to allow a user to input various types of information into the printer 10, and comprises for example, a touch screen and/or button(s). The user can enter various information into the printer 10 via the operation unit 12. The display unit 14 is a display for displaying various types of information. The communication OF 16 is connected to the LAN 4. The print engine 18 comprises a print mechanism such as, for example, an ink-jet scheme or a laser scheme.

The controller 30 comprises a CPU 32 and a memory 34. The CPU 32 performs various processes according to a program 36 stored in the memory 34. The memory 34 may be a ROM, RAM, for example. In addition to the above program 36, the memory 34 stores a history table 38, a model name of the printer 10, and version information indicating a version of a firmware of the printer 10. Content of the history table 38 will be described with reference to FIG. 2.

(Configuration of Server 100)

The server 100 manages information on vulnerabilities of various printers including the printer 10 and information on countermeasures for those vulnerabilities. The server 100 includes a communication OF 116 and a controller 130. The communication OF 116 and the controller 130 are connected to a bus-line. The communication OF 116 is connected to the Internet 6.

The controller 130 comprises a CPU 132 and a memory 134. The CPU 132 is configured to execute various processes according to a program 136 stored in the memory 134. The memory 134 stores a vulnerability information table 138, a filter table 140, a setting table 142, and a message table 144 in addition to the program 136 described above. The contents of the respective tables 138 to 144 will be described later with reference to FIG. 2.

Figure 2:
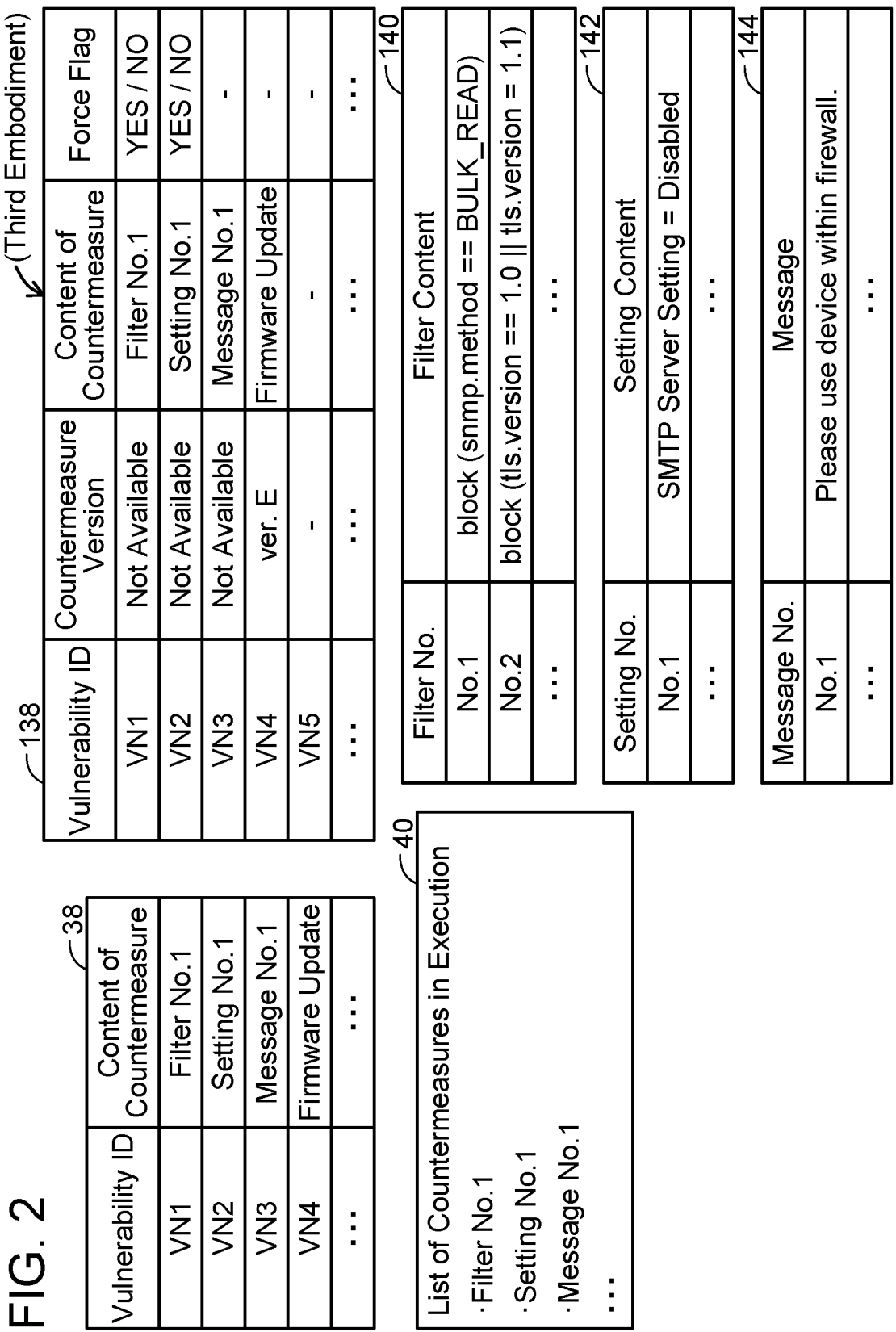
FIG. 2 illustrates contents of tables.

(Contents of Tables; FIG. 2)

Next, with reference to FIG. 2, the content of the history table 38 of the printer 10 and the contents of the respective tables 138 to 144 of the server 100 will be described.

The history table 38 of the printer 10 indicates countermeasures the printer 10 is currently executing for respective vulnerabilities of the printer 10. The history table 38 stores a vulnerability ID identifying a vulnerability and a countermeasure content for that vulnerability in association with each other. In the present embodiment, the countermeasure content is one of "Filter", "Setting", "Message", and "Firmware Update". Details of the countermeasures will be described later when each of the tables 138 to 144 is described.

The vulnerability information table 138 of the server 100 indicates a list of vulnerabilities for each of printers of different model names. In FIG. 2, only the vulnerability information table 138 showing a list of vulnerabilities of a printer having a certain model name (the printer 10 in the present embodiment) is shown. The vulnerability information table 138 stores the vulnerability ID, a countermeasure version, and a countermeasure content in association with each other. The countermeasure version indicates a version of the firmware configured to perform a countermeasure for the vulnerability identified by the associated vulnerability ID.

For example, assumingly, a vendor of the printer 10 discovers a vulnerability of the printer 10. In this case, the vendor then updates the vulnerability information table 138 of the server 100. What countermeasure to be taken for the vulnerability might be undecided when the vulnerability of the printer 10 is discovered. In this case, only the vulnerability ID is stored in the vulnerability information table 138 (e.g., see vulnerability ID "VN5"). That is, in the vulnerability information table 138, the countermeasure version and the countermeasure content are not stored in association with this vulnerability ID. Once a countermeasure is determined for this vulnerability, the vendor updates the vulnerability information table 138. That is, the countermeasure version and the countermeasure content are stored in association with the vulnerability ID.

The filter table 140 indicates contents of filters to be applied to the printer, and stores a filter No. and a filter content in association with each other. In the example of FIG. 2, for example, the filter No. 1 and the filter content "block (snmp.method==BULK_READ)" are associated with each other. "block (snmp.method==BULK_READ)" means blocking (i.e., filtering) BULK_READ command of Simple Network Management Protocol (SNMP). Also, for example, "block (tls.version==1.0∥tls.version==1.1", associated with a filter No. 2 means blocking (i.e., filtering) command(s) according to ver 1.0 or ver 1.1 of Transport Layer Security (TLS). Thus, generally speaking, "Filter" means to block receipt of a certain command in the printer.

The setting table 142 indicates contents of settings to be applied to the printer, and stores a setting No. and a setting content in association with each other. In the example of FIG. 2, for example, a setting No. 1 and a setting content "SMTP Server Setting=Disabled" are associated with each other. "SMTP Server Setting=Disabled" means to turn off the printer's Simple Mail Transfer Protocol (SMTP) server setting, i.e., to turn off an email sending function. Generally speaking, "Setting" means to change a specific setting of a printer.

The message table 144 indicates contents of messages to be outputted by the printer, and stores a message No. and a message in association with each other. In the example of FIG. 2, for example, a message No. 1 and a message "Please use device within firewall." are associated with each other.

When a new countermeasure content is added, the corresponding table(s) are updated by the vendor.

In order to ensure the security of the printer 10, it is desired to update a firmware configured to cover the vulnerabilities of the printer 10. It, however, typically takes some time to prepare a new firmware (i.e., program) after a vulnerability is discovered. In the present embodiment, one of the above-described countermeasures of "Filter", "Setting", and "Message" is implemented in order to ensure the security of the printer 10 until a new firmware is prepared.

Figure 3:
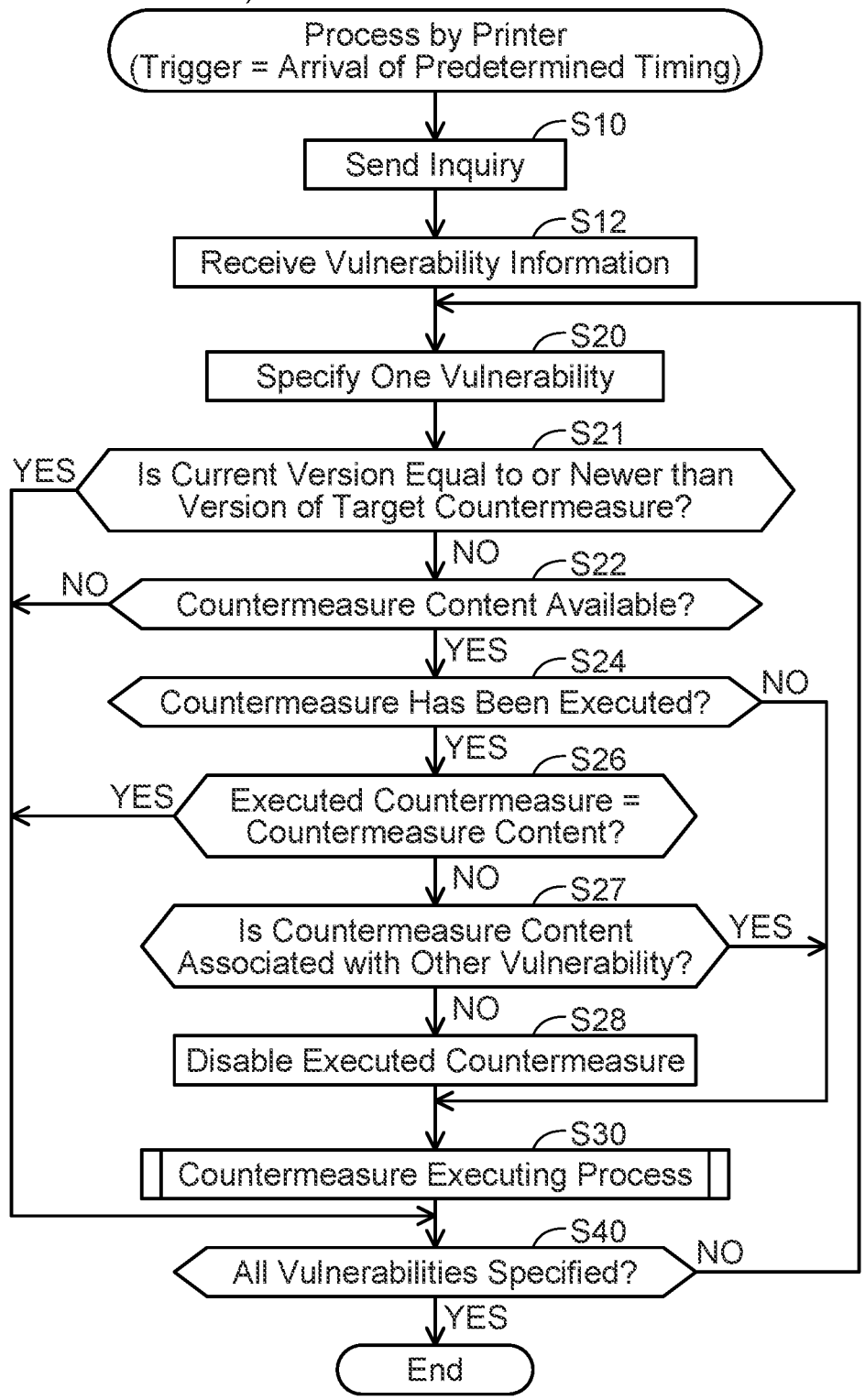
FIG. 3 illustrates a flowchart of processes performed by a printer.

(Processes of Printer 10; FIG. 3)

Next, with reference to FIG. 3, processes executed by the CPU 32 of the printer 10 will be described. The processes of FIG. 3 are started when a predetermined timing (for example, predetermined cycle, predetermined date and time) arrives.

In S10, the CPU 32 sends an inquiry to the server 100 via the communication OF 16. The inquiry includes the model name of the printer 10. In a modification, the process of S10 may be omitted. In this case, the printer 10 and the server 100 may be configured to execute server-push type communication therebetween, and the printer 10 may receive vulnerability information from the server 100 without sending an inquiry to the server 100.

In S12, the CPU 32 receives, via the communication OF 16, vulnerability information corresponding to the model name included in the inquiry from the server 100. The vulnerability information includes all pieces of information included in the vulnerability information table 138 corresponding to the model name. That is, the vulnerability information includes vulnerability IDs, countermeasure versions, and countermeasure contents. Further, in S12, the CPU 32 also receives specific contents indicated by the received countermeasure contents. For example, when the received countermeasure contents include the "Filter No. 1", the CPU 32 also receives the filter content associated with the filter No. 1 in the filter table 140, "block (snmp.mthod==BULK_READ"). Alternatively, in a modification, the CPU 32 may receive, for example, a file including the filter content, a script including the filter content (i.e., a computer program), and/or position information (e.g., a URL) indicating a position in which the above-mentioned file or script is stored (e.g., a position in the server 100).

In S20, the CPU 32 identifies one vulnerability ID of the plural vulnerability IDs included in the received vulnerability information. Hereinafter, the vulnerability ID identified here will be referred to as "target vulnerability ID". In addition, the vulnerability identified by the target vulnerability ID will be referred to as "target vulnerability".

In S21, the CPU 32 compares the version of the firmware indicated by the version information in the memory 34 (hereinafter referred to as "current version") with the countermeasure version associated with the target vulnerability ID (hereinafter referred to as the "target countermeasure version"). When the current version is newer than or is equal to the target countermeasure version, the CPU 32 determines YES in S21 and proceeds to S40. Contrary to this, when the current version is a version older than the target countermeasure version or when the target countermeasure version indicates "Not Available", the CPU 32 determines NO in S21 and proceeds to S22.

In S22, the CPU 32 determines whether there is a countermeasure content associated with the target vulnerability ID in the received vulnerability information. For example, there may be a case where, if the target vulnerability was just discovered shortly before, the countermeasure content for the target vulnerability is not be determined yet, and thus the countermeasure content associated with the target vulnerability ID does not exist (e.g., see the vulnerability ID "VN5" in the vulnerability information table 138 of FIG. 2). When there is a countermeasure content associated with the target vulnerability ID (e.g., in cases of the vulnerability IDs "VN1" to "VN4" of the vulnerability information table 138 in FIG. 2), the CPU 32 determines YES in S22 and proceeds to S24. Hereinafter, the countermeasure content associated with the target vulnerability ID will be referred to as "target countermeasure content". Contrary to this, when there is no countermeasure content associated with the target vulnerability ID (e.g., in the case of the vulnerability ID "VN5" of the vulnerability information table 138), the CPU 32 determines NO in S22 and proceeds to S40.

In S24, the CPU 32 determines whether the countermeasure for the target vulnerability has been executed or not. Specifically, the CPU 32 determines whether the history table 38 includes the target vulnerability ID. When the CPU 32 determines that the history table 38 includes the target vulnerability ID, the CPU 32 determines YES in S24 and proceeds to S26. Contrary to this, when the CPU 32 determines that the history table 38 does not include the target vulnerability ID, the CPU 32 determines NO in S24 and proceeds to S30.

In S26, the CPU 32 determines whether the countermeasure the printer 10 has executed and the target countermeasure content are the same as each other or not. Specifically, the CPU 32 specifies, from the history table 38, the countermeasure content associated with the target vulnerability ID. Then, when the specified countermeasure content matches the target countermeasure content, the CPU 32 determines YES in S26 and proceeds to S40. Contrary to this, when the specified countermeasure content and the target countermeasure content do not match, the CPU 32 determines NO in S26 and proceeds to S27.

In S27, the CPU 32 determines, in the history table 38, whether the target countermeasure content is associated with another vulnerability ID that is different from the target vulnerability ID. When the target countermeasure content is associated with another vulnerability ID, the CPU 32 determines YES in S27 and proceeds to S30. Due to this, since the process of S28 is skipped when the same countermeasure is being executed for the vulnerabilities identified by the different vulnerability IDs, this countermeasure is not disabled. On the other hand, when the target countermeasure content is not associated with another vulnerability ID, the CPU 32 determines NO in S27 and proceeds to S28.

In S28, the CPU 32 disables the countermeasure the printer 10 has executed. That is, the CPU 32 disables the countermeasure indicated by the countermeasure content associated with the target vulnerability ID in the history table 38. For example, if the countermeasure content is "Filter No. 1", the blocking of BULK_READ command of SNMP is deblocked. Further, for example, when the countermeasure content is "Setting No. 1", the SMTP server setting is turned on. Further, for example, when the countermeasure content is "Message No. 1", the displaying of the message is stopped.

In S30, the CPU 32 executes a countermeasure executing process. Details of the countermeasure execution process will be described later with reference to FIG. 4.

In S40, the CPU 32 determines whether or not the vulnerability IDs included in the vulnerability information received in S12 have all been specified in S20. When all the vulnerability IDs have been specified, the CPU 32 determines YES in S40 and ends the processes of FIG. 3. Contrary to this, when the vulnerability IDs have not all been specified (i.e., one or more of the vulnerability IDs have not been specified), the CPU 32 determines NO in S40, and returns to the process of S20 to specify another vulnerability ID as the target vulnerability ID.

Figure 4:
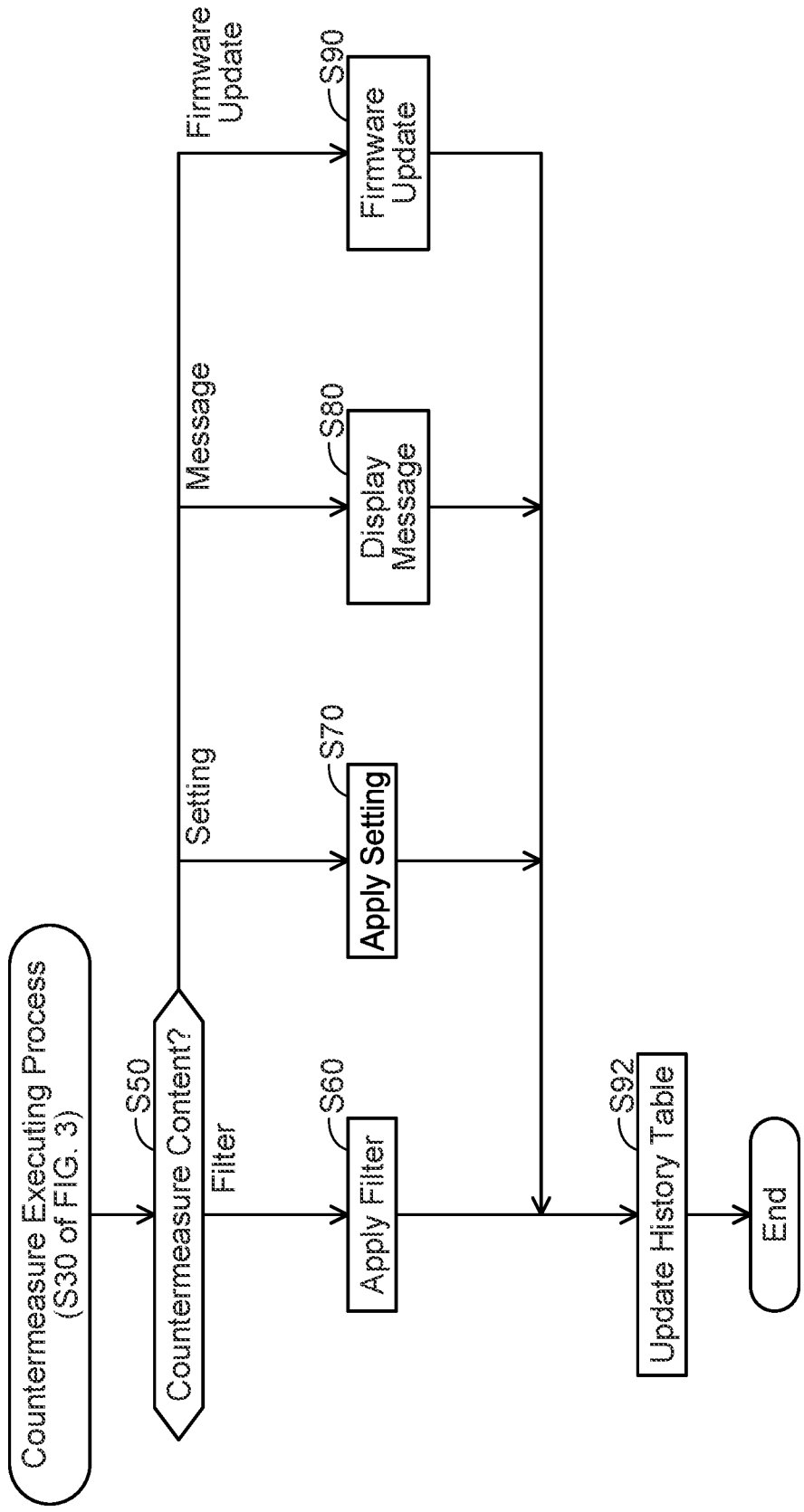
FIG. 4 illustrates a flow chart of a countermeasure execution process.

(Countermeasure Executing Process; FIG. 4)

Next, with reference to FIG. 4, a countermeasure executing process of S30 of FIG. 3 will be described. In S50, the CPU 32 determines which the countermeasure content is, "Filter", "Setting", "Message", or "Firmware Update". The CPU 32 proceeds to one of S60, S70, S80, and S90 according to the target countermeasure content.

In S60, the CPU 32 applies the filter indicated by the target countermeasure content. Specifically, the CPU 32 applies the filter that is the specific countermeasure content which was received together with the target countermeasure content in S12 of FIG. 3. For example, when the target countermeasure content is "Filter No. 1", the CPU 32 blocks (i.e., filters) the BULK_READ command of SNMP.

In S70, the CPU 32 applies the setting indicated by the target countermeasure content. Specifically, the CPU 32 applies the setting that is the specific countermeasure content which was received together with the target countermeasure content in S12 of FIG. 3. For example, when the target countermeasure content is "Setting No. 1", the CPU 32 turns off the SMTP server setting.

In S80, the CPU 32 causes the display unit 14 to display a message indicated by the target countermeasure content. Specifically, the CPU 32 causes the display unit 14 to display a message that is the specific countermeasure content which was received together with the target countermeasure content in S12 of FIG. 3. For example, when the target countermeasure content is "Message No. 1", the CPU 32 causes the display unit 14 to display a screen including the message specified by Message No. 1 (i.e., "Please use device within firewall.").

In S90, the CPU 32 performs a firmware update. Specifically, the CPU 32 specifies the target countermeasure version associated with the target countermeasure content. Then, the CPU 32 accesses a predetermined firmware server (not illustrated), downloads the firmware of the specified target countermeasure version, and updates to the downloaded firmware.

In S92, the CPU 32 updates the history table 38. Specifically, the CPU 32 stores the target vulnerability ID and the target countermeasure content in association with each other in the history table 38. In particular, in S92 that has passed through S28 of FIG. 3, the target countermeasure content is stored in association with the target vulnerability ID in the history table 38 instead of the countermeasure content stored in association with the target vulnerability ID. When the process of S92 ends, the processes of FIG. 4 end.

Figure 5:
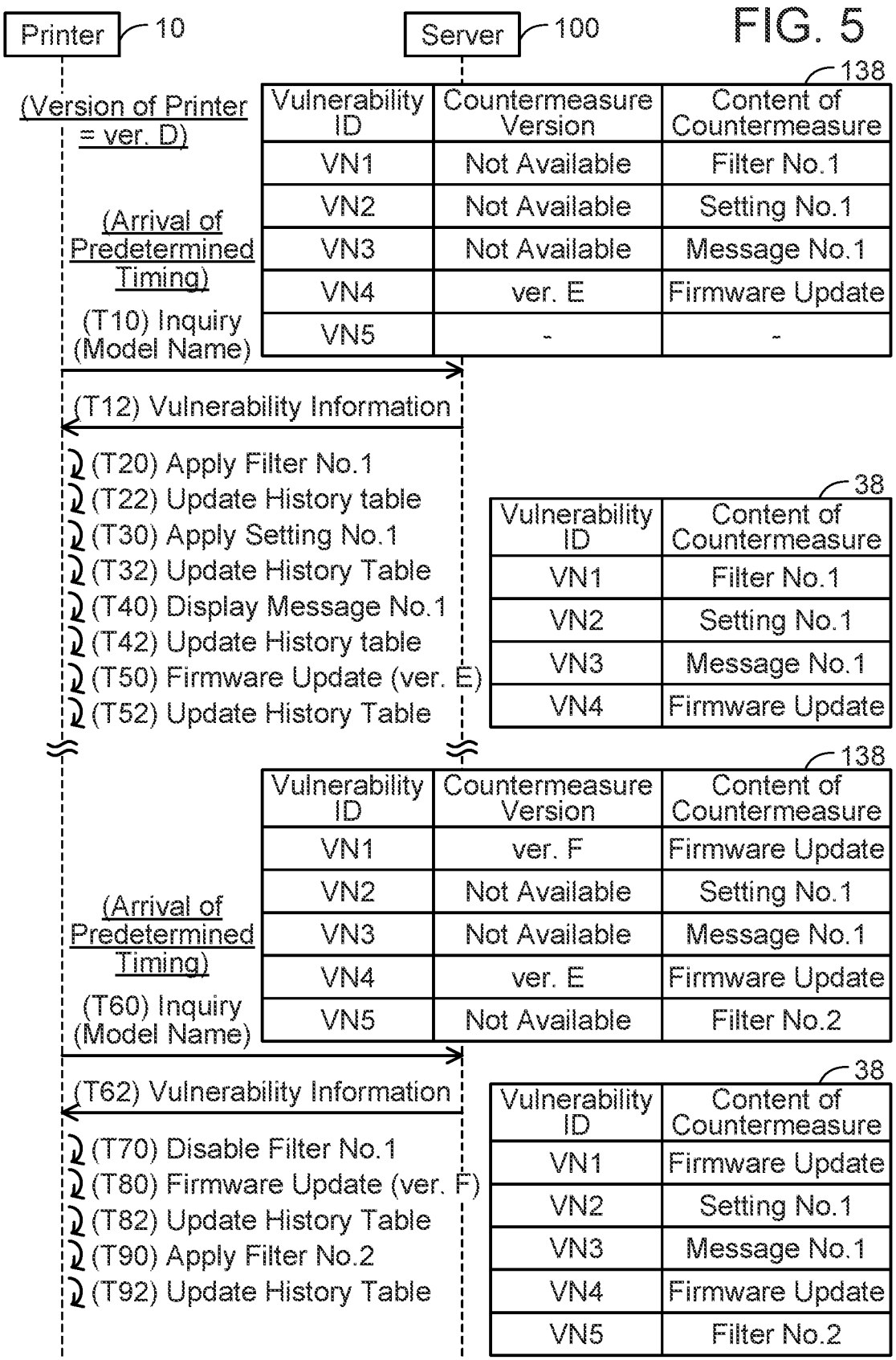
FIG. 5 illustrates a sequence diagram of a specific case.

(Specific Case; FIG. 5)

Next, with reference to FIG. 5, a specific case realized by the processes of FIGS. 3 and 4 will be described. In an initial state of FIG. 5, the firmware version of the printer 10 is "ver. D". No countermeasures have been executed in the printer 10. That is, in the initial state of FIG. 5, the history table 38 of the printer 10 is blank. In addition, the vulnerability information table 138 of the server 100 stores five vulnerabilities identified by five vulnerability IDs "VN1" to "VN5" as the vulnerabilities of the printer 10. Hereinafter, processes executed by a CPU (e.g., 32, 132) of each device (e.g., the printer 10, the server 100) will be described with each device as a subject of process, without describing the CPU as a subject of process, for easier understanding. Communication between the devices is performed via a communication OF (e.g., 16, 116). Therefore, hereinafter, the description of "via a communication I/F" will be omitted when descriptions about communication are made.

When the predetermined timing arrives (trigger for the processes of FIG. 3), the printer 10 sends an inquiry including the model name of the printer 10 to the server 100 in T10 (S10).

When the server 100 receives the inquiry from the printer 10 in T10, the server 100 uses the model name included in the inquiry to specify the vulnerability information table 138 indicating the vulnerabilities of the printer having the model name. Next, the server 100 specifies, from the respective tables 140 to 144, specific contents indicated by the countermeasure contents included in the specified vulnerability information table 138. The server 100 then sends the vulnerability information including the specified pieces of information to the printer 10 in T12.

The printer 10 receives the vulnerability information from the server 100 in T12 (S12). In this case, the printer 10 firstly specifies one vulnerability ID "VN1" from the received vulnerability information (S20). The vulnerability ID "VN1" is in association with the countermeasure version "Not Available" and the countermeasure content "Filter No. 1" (NO in S21, YES in S22). In addition, the history table 38 is currently blanked (NO in S24). Therefore, the printer 10 applies, in T20, the filter indicated by the countermeasure content "Filter No. 1" associated with the vulnerability ID "VN1" (S30, "Filter" in S50, S60 of FIG. 4). That is, the printer 10 blocks BULK_READ command of SNMP. Then, the printer 10 stores the vulnerability ID "VN1" and the countermeasure content "Filter No. 1" in association with each other in the history table 38 in T22 (S92).

The printer 10 then specifies another vulnerability ID "VN2" from the vulnerability information which was received from the server 100 (NO in S40, S20 of FIG. 3). The vulnerability ID "VN2" is in association with the countermeasure version "Not Available" and the countermeasure content "Setting No. 1" (NO in S21, YES in S22). Furthermore, at this time, the history table 38 does not have the vulnerability ID "VN2" stored therein (NO in S24). Therefore, the printer 10 applies the filter indicated by the countermeasure content "Setting No. 1" associated with the vulnerability ID "VN2" in T30 (S30, "Setting" in S50, S70 of FIG. 4). That is, the printer 10 turns off the SMTP server setting. Then, the printer 10 stores the vulnerability ID "VN2" and the countermeasure content "Setting No. 1" in association with each other in the history table 38 in T32 (S92). As such, even when the countermeasure for the vulnerability identified by the vulnerability ID "VN1" has already been executed, the printer 10 can execute the countermeasure for the vulnerability identified by the vulnerability ID "VN2" without disabling the countermeasure for the vulnerability identified by the vulnerability ID "VN1". Therefore, it is possible to take an appropriate countermeasure for each of the vulnerabilities of the printer 10.

The printer 10 then specifies another vulnerability ID "VN3" from the vulnerability information which was received from the server 100 (NO in S40, S20 of FIG. 3). The vulnerability ID "VN3" is in association with the countermeasure version "Not Available" and the countermeasure content "Message No. 1" (NO in S21, YES in S22). Furthermore, at this time, the history table 38 does not have the vulnerability ID "VN3" stored therein (NO in S24). Accordingly, the printer 10 displays, in T40, a message indicated by the countermeasure content "Message No. 1" associated with the vulnerability ID "VN3" (S30, "Message" in S50, S80 of FIG. 4). That is, the printer 10 displays a screen including the message "Please use device within firewall." Then, the printer 10 stores the vulnerability ID "VN3" and the countermeasure content "Message No. 1" in association with each other in the history table 38 in T42 (S92).

The printer 10 then specifies another vulnerability ID "VN4" from the vulnerability information which was received from the server 100 (NO in S40, S20 of FIG. 3). The vulnerability ID "VN4" is in association with the countermeasure version "ver. E" and the countermeasure content "Firmware Update", and here, the current version is "ver. D" and is an older version than the countermeasure version "ver. E" (NO in S21, YES in S22). Furthermore, at this time, the history table 38 does not have the vulnerability ID "VN4" stored therein (NO in S24). Therefore, the printer 10 updates the version of the firmware of the printer 10 to ver. E in accordance with the countermeasure version "ver. E" and the countermeasure content "Firmware Update" that are associated with the vulnerability ID "VN4" in T50 (S30, "Firmware Update" in S50, S90 of FIG. 4). Then, the printer 10 stores the vulnerability ID "VN4" and the countermeasure content "Firmware Update" in association with each other in the history table 38 in T52 (S92).

The printer 10 then specifies another vulnerability ID "VN5" from the vulnerability information received from the server 100 (NO in S40, S20 of FIG. 3). The vulnerability ID "VN5" is not currently associated with any countermeasure content (NO in S22). All the vulnerability IDs "VN1" to "VN5" included in the vulnerability information received from the server 100 are specified by the above processes (YES in S40 of FIG. 3).

Before the predetermined timing arrives again after the process of T52 has been executed, the vulnerability information table 138 of the server 100 is updated. Specifically, firstly, the countermeasure version and the countermeasure content associated with the vulnerability ID "VN1" are updated to "ver. F" and "Firmware Update", respectively. In addition, the countermeasure version "Not Available" and the countermeasure content "Filter No. 2" are stored in association with the vulnerability ID "VN5". After the vulnerability information table 138 of the server 100 has been updated, the predetermined timing rearrives (trigger for the processes of FIG. 3).

The process of T60 is the same as the process of T10. The process of T62 is the same as the process of T12 except that the information included in the vulnerability information differs.

The printer 10 specifies the vulnerability ID "VN1" from the received vulnerability information (S20). The vulnerability ID "VN1" is stored in association with the countermeasure version "Ver. F" and the countermeasure content "Firmware Update", and here the current version is "Ver. E" and is an older version than the countermeasure version "Ver. F" (NO in S21, YES in S22). Also currently, the history table 38 has the vulnerability ID "VN1" and the countermeasure content "Filter No. 1" stored in association with each other (YES in S24). The countermeasure content "Firmware Update" associated with the vulnerability ID "VN1" included in the received vulnerability information differs from the countermeasure content "Filter No. 1" associated with the vulnerability ID "VN1" in the history table 38 (NO in S26). The printer 10 therefore disables Filter No. 1 in T70 (S28). That is, the printer 10 de-blocks BULK_READ command of SNMP. Then, the printer 10 updates the version of the firmware of the printer 10 to ver.

F in accordance with the countermeasure version "ver. F" and the countermeasure content "Firmware Update" associated with the vulnerability ID "VN1" in T80 (S30, "Firmware Update" in S50, S90 of FIG. 4). Then, the printer 10 stores the countermeasure content "Firmware Update" in the history table 38 instead of the countermeasure content "Filter No. 1" in association with the vulnerability ID "VN1" in T82 (S92). As such, the printer 10 can take a latest countermeasure for the vulnerability identified by the vulnerability ID "VN1".

The countermeasure contents stored in association with the vulnerability IDs "VN2" to "VN4" have not been changed. That is, since the countermeasure which the printer 10 has executed and the countermeasure indicated by the countermeasure content included in the received vulnerability information are the same for each of the vulnerability IDs "VN2" to "VN4" (YES in S26), the countermeasure execution process is not executed for each of these vulnerability IDs.

Then, the printer 10 specifies another vulnerability ID "VN5" from the received vulnerability information (S20). The vulnerability ID "VN5" is stored in association with the countermeasure version "Not Available" and the countermeasure content "Filter No. 2" (NO in S21, YES in S22). Furthermore, at this timing, the history table 38 does not have the vulnerability ID "VN5" stored therein (NO in S24). Therefore, the printer 10 applies, in T90, the filter indicated by the countermeasure content "Filter No. 2" associated with the vulnerability ID "VN5" (S30, "Filter" in S50, S60 of FIG. 4). That is, the printer 10 blocks command(s) conforming to ver1.0 or ver1.1 of TLS. Then, the printer 10 stores the vulnerability ID "VN5" and the countermeasure content "Filter No. 2" in the history table 38 in association with each other in T92 (S92).

Effect of First Embodiment

According to the above configuration, in a situation where the countermeasure "Filter No. 1" for the vulnerability identified by the vulnerability ID "VN1" is being executed, the printer 10 receives the vulnerability information including a new countermeasure content "Firmware Update" for this vulnerability from the server 100 (T60 of FIG. 5). In this case, the printer 10 disables the countermeasure "Filter No. 1" (T70), and executes the new countermeasure "Firmware Update" (T80). As such, the printer 10 can take the latest countermeasure for the vulnerability identified by the vulnerability ID "VN1". Due to this, the security of the printer 10 can be enhanced.

(Correspondence Relationship)

The printer 10 is an example of "communication device". The server 100 is an example of "server". The vulnerability ID is an example of "vulnerability identification information". The vulnerability of the printer 10 identified by the vulnerability ID "VN1" is an example of "first vulnerability". The vulnerability of the printer 10 identified by any of the vulnerability IDs "VN2" to "VN5 is an example of "second vulnerability." The countermeasure content "Filter No. 1" associated with the vulnerability ID "VN1" is an example of "first content information". The countermeasure content "Firmware Update" associated with the vulnerability ID "VN1" is an example of "second content information".

The process of S12 of FIG. 3 and the process of T12 of FIG. 5 are an example of "receive, from a server, first countermeasure information (and receive, from the server, third countermeasure information)". The process of S12 of FIG. 3 and the process of T62 of FIG. 5 are an example of "receive, from the server, second countermeasure information (and receive, from the server, third countermeasure information)". The process of S60 of FIG. 4 and the process of T20 of FIG. 5 are an example of "execute the first countermeasure". The process of S28 of FIG. 3 and the process of T70 of FIG. 5 are an example of "disable the first countermeasure". The process of S90 of FIG. 4 and the process of T80 of FIG. 5 are an example of "execute the second countermeasure". The process of S60 of FIG. 4 and the process of T30 of FIG. 5 are an example of "execute the third countermeasure". The process of S92 of FIG. 4 and the processes of T22, T32, T42, T52 of FIG. 5 are an example of "store the vulnerability identification information included in the first countermeasure information and the first content information included in the first countermeasure information in association with each other in the memory". The process of S92 of FIG. 4 and the process of T82 of FIG. 5 are an example of "store, in the memory, the second content information included in the second countermeasure information in association with the vulnerability identification information instead of the first content information".

SECOND EMBODIMENT

Figure 6:
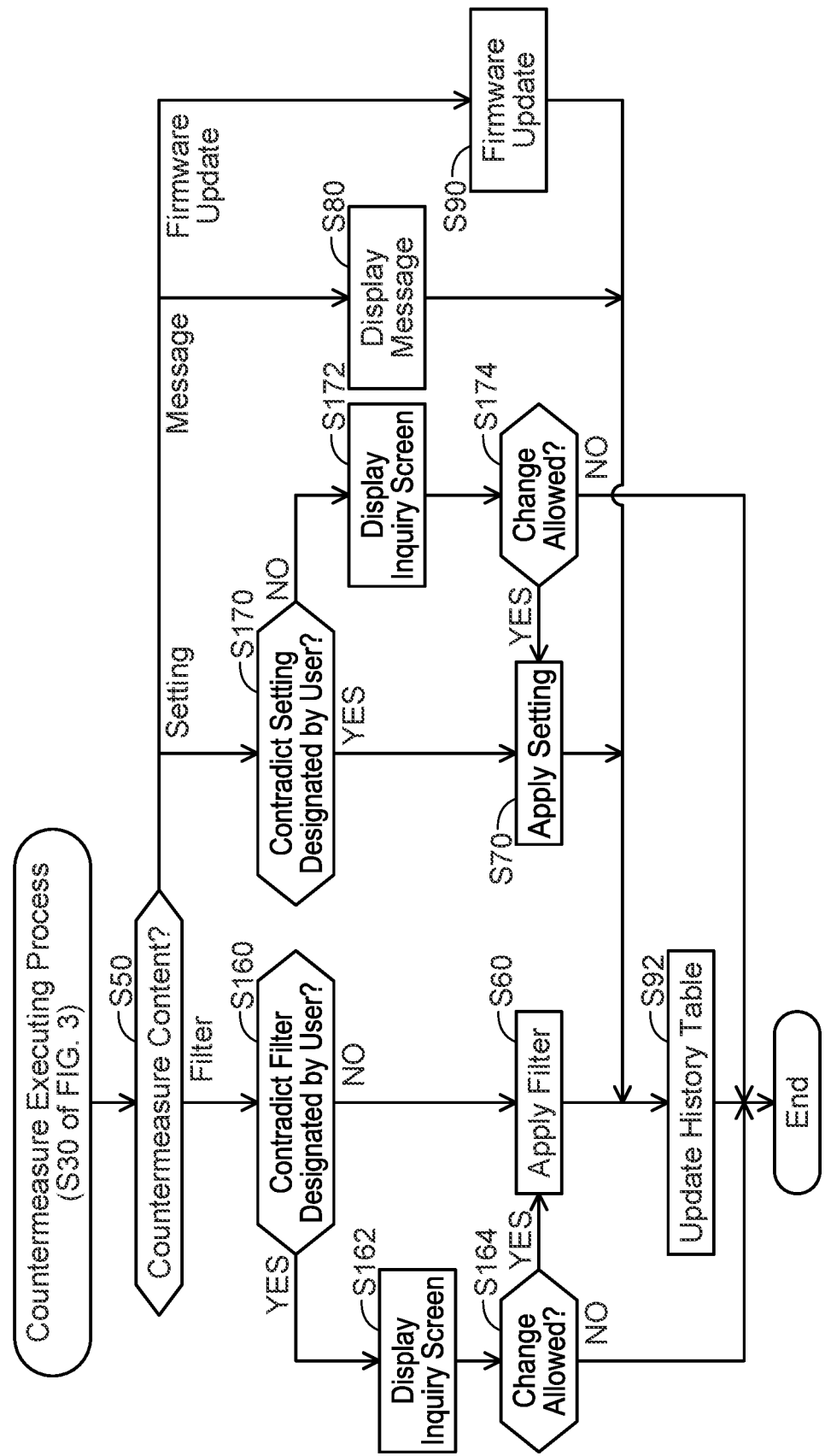
FIG. 6 illustrates a flow chart of a countermeasure execution process.

Next, a second embodiment will be described with reference to FIG. 6. The second embodiment differs from the first embodiment in content of the countermeasure execution process. In FIG. 6, the same reference numerals as those in FIG. 4 are assigned to processes the same as those in the countermeasure execution process of the first embodiment, and detailed description thereof will be omitted.

(Countermeasure Execution Process; FIG. 6)

In S50 of FIG. 6, the CPU 32 proceeds to S160 when it is determined that the target countermeasure content is "Filter". In S160, the CPU 32 determines whether the filter indicated by the target countermeasure content contradicts the filter designated by the user. For example, a situation may be assumed in which the target countermeasure content is "Filter No. 1" (i.e., blocking the BULK_READ command of SNMP) and it is designated by the user that the BULK_READ command of SNMP is not to be blocked. Under such circumstances, since the filter indicated by the target countermeasure content and the filter designated by the user contradict each other, the CPU 32 determines YES in S160 and proceeds to S162. Contrary to this, when the filter indicated by the target countermeasure content and the filter designated by the user do not contradict each other, the CPU 32 determines NO in S160 and proceeds to S60. Here, the CPU 32 also determines NO in S160 and proceeds to S60 when no filter has been designated by the user (i.e., when the communication setting is default setting).

In S162, the CPU 32 causes the display unit 14 to display an inquiry screen. The inquiry screen is a screen for inquiring the user whether or not the filter indicated by the target countermeasure content is to be applied, that is, whether or not the communication setting of the printer 10 is to be changed. Here, the inquiry screen may include a message indicating that the filter indicated by the target countermeasure content and the filter designated by the user contradict each other.

In S164, the CPU 32 determines whether the user has selected to apply the filter indicated by the target countermeasure content in the inquiry screen or not. The CPU 32 determines YES in S164 and proceeds to S60 when the user has selected to apply the filter indicated by the target countermeasure content. Contrary to this, when the user selects not to apply the filter indicated by the target countermeasure content, the CPU 32 determines NO in S164 and ends the process of FIG. 6.

Further, the CPU 32 proceeds to S170 when it is determined in S50 that the target countermeasure content is "Setting". In S170, the CPU 32 determines whether the setting indicated by the target countermeasure content contradicts the setting designated by the user. For example, a situation will be assumed in which the target countermeasure content is "Setting No. 1" (i.e., turning off the SMTP server setting) and it is designated by the user that the SMTP server setting is to be turned on. In such a circumstance, since the setting indicated by the target countermeasure content and the setting designated by the user contradict each other, the CPU 32 determines YES in S170 and proceeds to S172. Contrary to this, when the setting indicated by the target countermeasure content and the setting designated by the user do not contradict each other, the CPU 32 determines NO in S170 and proceeds to S70. Here, the CPU 32 determines NO in S170 and proceeds to S70 also when no setting has been designated by the user (i.e., when the communication setting is default setting).

In S172, the CPU 32 causes the display unit 14 to display an inquiry screen. The inquiry screen is a screen for inquiring the user whether or not the setting indicated by the target countermeasure content is to be applied, that is, whether or not the communication setting of the printer 10 is to be changed. The inquiry screen may include a message indicating that the setting indicated by the target countermeasure content and the setting designated by the user contradict each other.

In S174, the CPU 32 determines whether or not the user has selected to apply the setting indicated by the target countermeasure content in the inquiry screen. When it is selected by the user that the setting indicated by the target countermeasure content is to be applied, the CPU 32 determines YES in S174 and proceeds to S70. Contrary to this, when it is selected by the user that the setting indicated by the target countermeasure content is not to be applied, the CPU 32 determines NO in S174 and ends the process of FIG. 6.

Effect of Second Embodiment

According to the above configuration, when the target countermeasure content and the communication setting designated by the user contradict each other, the printer 10 can prevent the printer 10 from executing the countermeasure indicated by the target countermeasure content (YES in S160 or YES in S170 of FIG. 6). Due to this, the communication setting designated by the user is suppressed from being changed. In addition, even when the target countermeasure content and the communication setting designated by the user contradict each other, the user can select whether or not to cause the printer 10 to execute the countermeasure indicated by the target countermeasure content via the inquiry screen (see S162, S172 in FIG. 6).
(Correspondence Relationship)

The communication setting indicating that the BULK_READ command of SNMP is not to be blocked is an example of "first value". The communication setting indicating that the BULK_READ command of SNMP is to be blocked (i.e., the communication setting indicated by Filter No. 1) is an example of "second value". The inquiry screen displayed in S162 of FIG. 6 and the inquiry screen displayed in S172 of FIG. 6 are examples of "inquiry screen". The process of S162 and the process of S172 in FIG. 6 are an example of "cause a display unit of the communication device to display an inquiry screen".

THIRD EMBODIMENT

Figure 7:
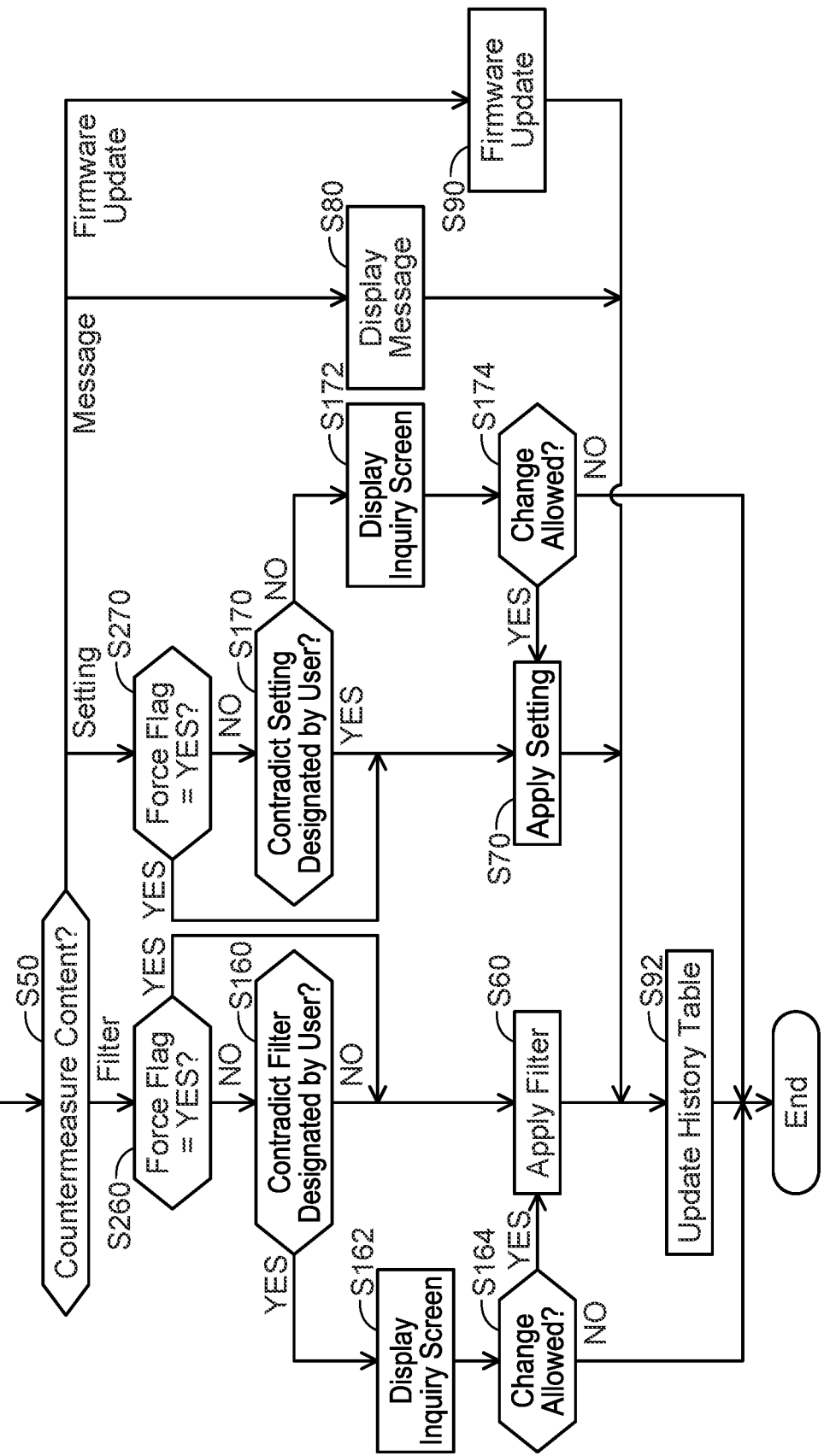
FIG. 7 illustrates a flow chart of a countermeasure execution process.

Next, a third embodiment will be described with reference to FIG. 7. In the third embodiment, the vulnerability information table 138 of the server 100 further stores a force flag (see FIG. 2). The force flag indicates either "YES" indicating that the countermeasure content is to be forcibly executed or "NO" indicating that the countermeasure content is not to be forcibly executed. In the present embodiment, the force flag is stored in association with a vulnerability ID with which the countermeasure content "Filter" or "Setting" is stored in association. That is, the force flag is not stored in association with the vulnerability ID with which the countermeasure content "Message" or "Firmware Update" is stored in association. In a modification, the force flag may also be stored in association with the vulnerability ID with which the countermeasure content "Message" or "Firmware Update" is stored in association. In FIG. 7, the same reference numerals as those in FIG. 6 are assigned to processes the same as those in the countermeasure execution process of the second embodiment, and detailed description thereof will be omitted.
(Countermeasure Execution Process; FIG. 7)

When it is determined in S50 of FIG. 7 that the target countermeasure content is "Filter", the CPU 32 proceeds to S260. In S260, the CPU 32 determines which the force flag associated with the target countermeasure content is, YES or NO. When the force flag indicates YES, the CPU 32 determines YES in S260 and proceeds to S60, whereas when the force flag indicates NO, the CPU 32 determines NO in S260 and proceeds to S160.

When it is determined in S50 of FIG. 7 that the target countermeasure content is "Setting", the CPU 32 proceeds to S270. The process of S270 is the same as the process of S260. When the force flag indicates YES, the CPU 32 determines YES in S270 and proceeds to S70, whereas when the force flag indicates NO, the CPU 32 determines NO in S270 and proceeds to S170.

Effect of Third Embodiment

According to the above configuration, when the force flag stored in association with the target countermeasure content indicates YES, the printer 10 can execute the countermeasure indicated by the target countermeasure content regardless of whether or not the target countermeasure content and the communication setting designated by the user contradict each other. Therefore, for example, in a situation where a certain countermeasure for a certain vulnerability is to be forcibly executed, the printer 10 can execute the countermeasure indicated by the target countermeasure content regardless of the settings designated by the user. The force flag is an example of "flag information".

FOURTH EMBODIMENT

Next, a fourth embodiment will be described with reference to FIG. 8. The printer 10 of the fourth embodiment stores a list of countermeasures in execution (in-execution countermeasure list) 40 instead of the history table 38 (see FIGS. 1 and 2). As shown in FIG. 2, the in-execution countermeasure list 40 shows a list of countermeasure contents which the printer 10 has already executed. In particular, in the fourth embodiment, the printer 10 does not store vulnerability IDs.

(Processes of Printer 10; FIG. 8)

Figure 8:
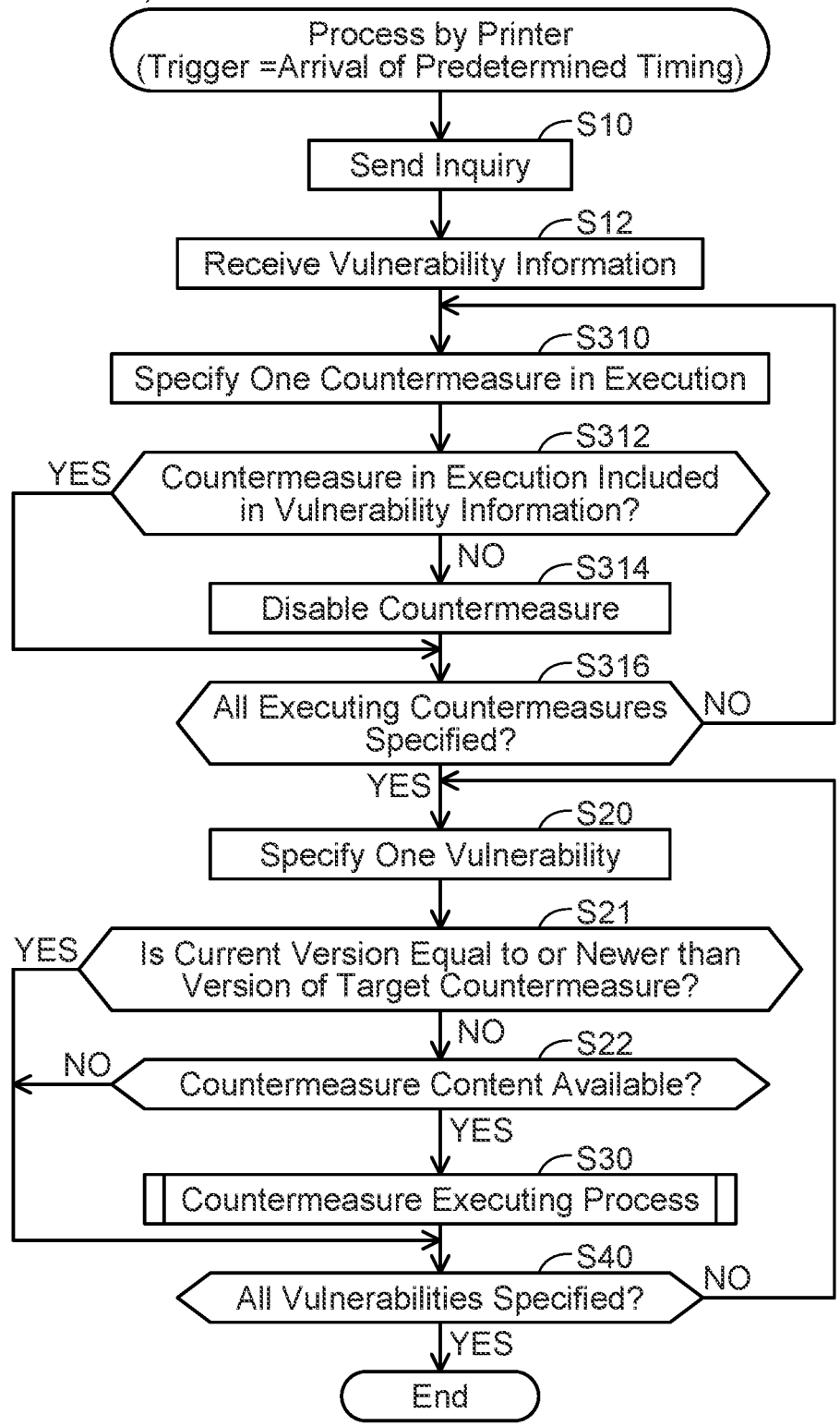
FIG. 8 illustrates a flowchart of processes performed by the printer.

With reference to FIG. 8, processes executed by the CPU 32 of the printer 10 will be described. The processes of FIG. 8 are started when a predetermined timing (e.g., a predetermined cycle, a predetermined date and time) arrives. In FIG. 8, the same reference numerals as those in FIG. 3 are assigned to processes the same as those by the printer 10 of the first embodiment, and detailed explanation thereof will be omitted.

In S310, the CPU 32 specifies one countermeasure content that has been executed from among the in-execution countermeasure list 40. In the following, the countermeasure content specified here will be referred to as "target executing countermeasure content".

In S312, the CPU 32 determines whether or not the specified target executing countermeasure content is included in the received vulnerability information. That is, the CPU 32 determines whether or not the specified target executing countermeasure content is stored in the vulnerability information table 138 of the server 100. When the target executing countermeasure content is included in the vulnerability information, the CPU 32 determines YES in S312 and proceeds to S316. Contrary to this, when the target executing countermeasure content is not included in the vulnerability information, the CPU 32 determines NO in S312 and proceeds to S314.

In S314, the CPU 32 disables the target executing countermeasure content that is not included in the received vulnerability information (i.e., the countermeasure content not included in the vulnerability information table 138 of the server 100). The specific process of S314 is the same as the process of S28 of FIG. 3. Further, in S314, the CPU 32 deletes the disabled target executing countermeasure content from the in-execution countermeasure list 40.

In S316, the CPU 32 determines whether or not the countermeasure contents included in the in-execution countermeasure list 40 have all been specified in S310. If all the countermeasure contents have been specified, the CPU 32 determines YES in S316 and proceeds to S20. The subsequent processes are the same as the processes after S20 of FIG. 3, except that the processes of S24 to S28 of FIG. 3 are not executed. Contrary to this, when the countermeasure contents have not all been specified (i.e., one or more of the countermeasure contents have not been specified), the CPU 32 determines NO in S316, returns to the process of S310, and specifies another countermeasure content being executed as the target executing countermeasure content.

Effect of Fourth Embodiment

According to the above configuration, the printer 10 disables, of the countermeasures that are being executed, a countermeasure that is not included in the vulnerability information received from the server 100 (i.e., the vulnerability information table 138 of the server 100). Due to this, the printer 10 can execute appropriately a countermeasure based on the current vulnerability information table 138.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) A situation will be assumed in which in the printer 10, a countermeasure indicated by the countermeasure content "Filter No. 1" is being executed for a vulnerability identified by a certain vulnerability ID. In this circumstance, when the vulnerability information including information associated with a different vulnerability ID and the countermeasure content "Filter No. 2" is received from the server 100, the printer 10 may disable the countermeasure indicated by the countermeasure content "Filter No. 1" and then execute the countermeasure indicated by the countermeasure content "Filter No. 2". Generally speaking, when "in the situation where the communication device is executing the first countermeasure, third countermeasure information corresponding to a third countermeasure for a second vulnerability different from the first vulnerability is received from the server", "the first countermeasure may be disabled".

(Modification 2) A situation will be assumed in which in the printer 10, for example, the countermeasure indicated by the countermeasure content "Filter No. 1" is being executed. When the vulnerability information including the countermeasure content "Filter No. 2" is received from the server 100 in this situation, the printer 10 may disable the countermeasure indicated by the countermeasure content "Filter No. 1" regardless of whether the countermeasure content "Filter No. 1" is further included in the vulnerability information or not. Further, in another modification, when the vulnerability information that does not include the countermeasure content "Filter No. 1" is received from the server 100, the printer 10 may disable the countermeasure indicated by the countermeasure content "Filter No. 1" regardless of whether the countermeasure content "Filter No. 2" is further included in the vulnerability information or not.

(Modification 3) In the above embodiments, in T82 of FIG. 5, the printer 10 stores the countermeasure content "Firmware Update" in the history table 38 instead of the countermeasure content "Filter No. 1" in association with the vulnerability ID "VN1". Alternatively, the printer 10 may add a new row and store them in that row in the history table 38 in T82 of FIG. 5. That is, in T82 of FIG. 5, the printer 10 may associate the vulnerability ID "VN1" with the countermeasure content "Firmware Update" and newly store (i.e., add) those in the history table 38. In the present modification, "store, in the memory, the second content information included in the second countermeasure information in association with the vulnerability identification information instead of the first content information" may be omitted.

(Modification 4) A situation will be assumed in which in the printer 10, a countermeasure indicated by the countermeasure content "Filter No. 1" is being executed for a vulnerability identified by a certain vulnerability ID. When the vulnerability information including information in which this vulnerability ID and the countermeasure content "Filter No. 2" are associated with each other is received from the server 100 in this situation, the printer 10 may disable the countermeasure indicated by the countermeasure content "Filter No. 1" and then execute the countermeasure indicated by the countermeasure content "Filter No. 2". Generally speaking, the "first countermeasure" and the "second countermeasure" may be the same type among "updating a firmware of the communication device", "changing communication setting of the communication device", and "outputting a message to draw attention to a user of the communication device".

(Modification 5) The printer 10 may, in S10 of FIG. 3, send an inquiry including the current version of the printer 10 to the server 100 in addition to the model name of the printer 10. In this case, the printer 10 may then only receive from the server 100 the vulnerability information associated with a countermeasure version older than the current version. In this modification, the printer 10 can omit the process of S21 of FIG. 3.

(Modification 6) In S12 of FIG. 8, the printer 10 of the fourth embodiment may receive the vulnerability information that does not include a vulnerability ID from the server 100.

(Modification 7) In each of the above embodiments, although the processes of the steps of FIGS. 3 to 8 are implemented by software (for example, the program 36, 136), but at least one of these processes may be implemented by hardware such as logic circuitry.

What is claimed is:

1. A communication device comprising a controller, wherein the controller is configured to:
    receive, from a server, first countermeasure information corresponding to a first countermeasure for a first vulnerability of the communication device, wherein the first countermeasure information includes vulnerability identification information for identifying the first vulnerability and first content information indicating the first countermeasure;
    in a case where the first countermeasure information is received from the server, execute the first countermeasure;
    in the case where the first countermeasure information is received from the server, store the vulnerability identification information included in the first countermeasure information and the first content information included in the first countermeasure information in association with each other in a memory of the communication device;
    in a situation where the communication device is executing the first countermeasure, receive, from the server, second countermeasure information corresponding to a second countermeasure for the first vulnerability, wherein the second countermeasure information includes the vulnerability identification information and second content information indicating the second countermeasure;
    in a case where the second countermeasure information is received from the server, disable the first countermeasure indicated by the first content information stored in the memory in association with the vulnerability identification information included in the second countermeasure information; and
    in the case where the second countermeasure information is received from the server, execute the second countermeasure.

2. The communication device as in claim 1, wherein the controller is further configured to:
    in the situation where the communication device is executing the first countermeasure, receive, from the server, third countermeasure information corresponding to a third countermeasure for a second vulnerability different from the first vulnerability; and
    in a case where the third countermeasure information is received from the server, execute the third countermeasure without disabling the first countermeasure.

3. The communication device as in claim 1, wherein the controller is configured to disable the first countermeasure in the case where the second countermeasure information is received from the server without the first countermeasure information being received from the server in the situation where the communication device is executing the first countermeasure.

4. The communication device as in claim 1, wherein the controller is further configured to:
    in the case where the second countermeasure information is received from the server, store, in the memory, the second content information included in the second countermeasure information in association with the vulnerability identification information instead of the first content information.

5. The communication device as in claim 1, wherein the first countermeasure is one of:
    updating a firmware of the communication device;
    changing communication setting of the communication device; and
    outputting a message to draw attention to a user of the communication device, and
the second countermeasure is another one of:
    updating a firmware of the communication device;
    changing the communication setting of the communication device; and
    outputting the message to draw attention to the user of the communication device.

6. The communication device as in claim 1, wherein the second countermeasure includes changing a specific communication setting of the communication device from a first value to a second value,
    the second countermeasure is not executed in the case where the second countermeasure information is received from the server in a situation where the specific communication setting is the first value and the first value is designated by a user, and
    the controller is configured to execute the second countermeasure in the case where the second countermeasure information is received from the server in a situation where the specific communication setting is the first value and the first value is a predesignated value determined at shipment of the communication device.

7. The communication device as in claim 6, wherein the controller is further configured to:
    in the case where the second countermeasure information is received from the server in the situation where the specific communication setting is the first value and the first value is designated by the user, cause a display unit of the communication device to display an inquiry screen, the inquiry screen being for inquiring whether to execute the second countermeasure,
    wherein the second countermeasure is not executed in a case where it is selected by the user that the second countermeasure is not to be executed, and
    the controller is configured to execute the second countermeasure in a case where it is selected by the user that the second countermeasure is to be executed.

8. The communication device as in claim 6,
wherein the second countermeasure information includes flag information indicating whether to forcibly execute the second countermeasure,
the second countermeasure is not executed in a case where the second countermeasure information including the flag information indicating that the second countermeasure is not to be forcibly executed is received from the server in the situation where the specific communication setting is the first value and the first value is designated by the user, and
the controller is configured to execute the second countermeasure in a case where the second countermeasure information including the flag information indicating that the second countermeasure is to be forcibly executed is received from the server in the situation where the specific communication setting is the first value and the first value is designated by the user.

9. A non-transitory computer-readable recording medium storing computer-readable instructions for a communication device,
the communication device comprises a processor,
wherein the computer-readable instructions, when executed by the processor, cause the communication device to:
receive, from a server, first countermeasure information corresponding to a first countermeasure for a first vulnerability of the communication device, wherein the first countermeasure information includes vulnerability identification information for identifying the first vulnerability and first content information indicating the first countermeasure;
in a case where the first countermeasure information is received from the server, execute the first countermeasure;
in the case where the first countermeasure information is received from the server, store the vulnerability identification information included in the first countermeasure information and the first content information included in the first countermeasure information in association with each other in a memory of the communication device;
in a situation where the communication device is executing the first countermeasure, receive, from the server, second countermeasure information corresponding to a second countermeasure for the first vulnerability, wherein the second countermeasure information includes the vulnerability identification information and second content information indicating the second countermeasure;
in a case where the second countermeasure information is received from the server, disable the first countermeasure indicated by the first content information stored in the memory in association with the vulnerability identification information included in the second countermeasure information; and
in the case where the second countermeasure information is received from the server, execute the second countermeasure.

10. A method performed by a communication device, the method comprising:
receiving, from a server, first countermeasure information corresponding to a first countermeasure for a first vulnerability of the communication device, wherein the first countermeasure information includes vulnerability identification information for identifying the first vulnerability and first content information indicating the first countermeasure;
in a case where the first countermeasure information is received from the server, executing the first countermeasure;
in the case where the first countermeasure information is received from the server, storing the vulnerability identification information included in the first countermeasure information and the first content information included in the first countermeasure information in association with each other in a memory of the communication device;
in a situation where the communication device is executing the first countermeasure, receiving, from the server, second countermeasure information corresponding to a second countermeasure for the first vulnerability, wherein the second countermeasure information includes the vulnerability identification information and second content information indicating the second countermeasure;
in a case where the second countermeasure information is received from the server, disabling the first countermeasure indicated by the first content information stored in the memory in association with the vulnerability identification information included in the second countermeasure information; and
in the case where the second countermeasure information is received from the server, executing the second countermeasure.

* * * * *